(12) United States Patent
Fantoni et al.

(10) Patent No.: US 11,459,429 B2
(45) Date of Patent: *Oct. 4, 2022

(54) PERFLUOROELASTOMER COMPOSITION

(71) Applicant: SOLVAY SPECIALTY POLYMERS ITALY S.P.A., Bollate (IT)

(72) Inventors: Matteo Fantoni, Vanzaghello (IT); Stefano Arrigoni, Cesate (IT); Stefano Bossolo, Parabiago (IT); Marco Avataneo, Senago (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/327,860

(22) PCT Filed: Jul. 16, 2015

(86) PCT No.: PCT/EP2015/066269
§ 371 (c)(1),
(2) Date: Jan. 20, 2017

(87) PCT Pub. No.: WO2016/012339
PCT Pub. Date: Jan. 28, 2016

(65) Prior Publication Data
US 2017/0204230 A1 Jul. 20, 2017

(30) Foreign Application Priority Data
Jul. 22, 2014 (EP) .................... 14178035

(51) Int. Cl.
*C08J 3/24* (2006.01)
*C08K 5/14* (2006.01)
(Continued)

(52) U.S. Cl.
CPC .............. *C08J 3/24* (2013.01); *C08F 214/26* (2013.01); *C08K 5/14* (2013.01); *C08K 5/17* (2013.01);
(Continued)

(58) Field of Classification Search
CPC ..... C08L 27/18; C08F 214/26; C08J 2327/16; C08J 2327/18; C08J 3/24
See application file for complete search history.

(56) References Cited

U.S. PATENT DOCUMENTS

| 4,035,565 A | 7/1977 | Apotheker et al. |
| 4,243,770 A | 1/1981 | Tatemoto et al. |

(Continued)

FOREIGN PATENT DOCUMENTS

| EP | 199138 A2 | 10/1986 |
| EP | 769521 A1 * | 4/1997 |

(Continued)

Primary Examiner — Mark S Kaucher
(74) Attorney, Agent, or Firm — Osha Bergman Watanabe & Burton LLP

(57) ABSTRACT

The invention pertains to a perfluoroelastomer composition comprising: at least one perfluoroelastomer comprising iodine and/or bromine atoms [perfluoroelastomer (A)]; from 0.5 to 5 weight parts, per 100 parts by weight of said perfluoroelastomer (A), of at least one bis-olefin [bis-olefin (OF)] having general formula (1) wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical; from 0.1 to 3 weight parts, per 100 parts by weight of said perfluoroelastomer (A), of at least one organic peroxide; from 0.1 to 3 weight parts, per 100 parts by weight of said perfluoroelastomer (A), of at least one organic base [base (B)] selected from the group consisting of: (i) non-aromatic primary amines or amides complying with general formula (B1m) or (Bid): $R_{bm}$—[C(O)]$_t$—NH$_2$ (B1m) H$_2$N—[C(O)]$_{t'}$—$R_{dm}$—[C(O)]$_{t''}$—NH$_2$ (Bid) wherein: each of t, t' and t", equal to or different from each other and at each occurrence is zero or 1; Rbm is a monovalent hydrocarbon non-aromatic group having 12 to 30 carbon atoms; Rdm is a divalent hydrocarbon non-aromatic group having 6 to 30 carbon atoms; and (ii) cycloaliphatic secondary or tertiary amines complying with general formula (II) (B2m) or (B2d) wherein: Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto; Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto.

(I)

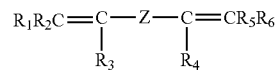

(II)

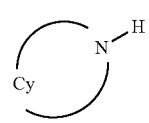

(B2m)

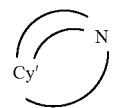

(B2d)

16 Claims, No Drawings

(51) Int. Cl.
*C08K 5/20* (2006.01)
*C08K 5/17* (2006.01)
*C08F 214/26* (2006.01)
*C08K 5/3465* (2006.01)

(52) U.S. Cl.
CPC ............ *C08K 5/20* (2013.01); *C08J 2327/16* (2013.01); *C08J 2327/18* (2013.01); *C08J 2329/10* (2013.01); *C08K 5/3465* (2013.01)

(56) References Cited

U.S. PATENT DOCUMENTS

| | | | |
|---|---|---|---|
| 4,564,662 A | | 1/1986 | Albin |
| 4,694,045 A | | 9/1987 | Moore |
| 4,745,165 A | | 5/1988 | Arcella et al. |
| 4,943,622 A | | 7/1990 | Naraki et al. |
| 5,173,553 A | | 12/1992 | Albano et al. |
| 6,465,576 B1 | * | 10/2002 | Grootaert ............ C08F 214/262 525/199 |
| 2005/0282969 A1 | | 12/2005 | Comino et al. |
| 2013/0109797 A1 | * | 5/2013 | Fantoni .................. C08L 27/18 524/366 |
| 2017/0313849 A1 | * | 11/2017 | Avataneo ............. C08K 5/0025 |

FOREIGN PATENT DOCUMENTS

| | | |
|---|---|---|
| WO | 2008003634 A1 | 1/2008 |
| WO | 2008003636 A1 | 1/2008 |

\* cited by examiner

PERFLUOROELASTOMER COMPOSITION

CROSS-REFERENCE TO RELATED APPLICATION

This application is a U.S. national stage entry under 35 U.S.C. § 371 of International Application No. PCT/EP2015/066269 filed Jul. 16, 2015, which claims priority to European application No. 14178035.3 filed on Jul. 22, 2014. The entire contents of these applications are explicitly incorporated herein by this reference.

TECHNICAL FIELD

This invention pertains to certain perfluoroelastomer curable blends, to a method of using the same for fabricating shaped articles and to cured articles there from.

BACKGROUND ART

Perfluoroelastomers are a class of high-performance materials with a diverse range of applications encompassing O-rings, valve stem seals, shaft seals, gaskets and hoses in chemical processing industry (CPI). Perfluoroelastomers have indeed established themselves as premium materials in this field of endeavours thanks to their un-matched heat, chemical and permeation resistance.

It is also understood that properties of final vulcanized parts made from perfluoroelastomers are greatly influenced by the curing system employed, with peroxide-based curing being considered as delivering higher performances over bis-phenol-based ionic curing.

In peroxide-based curing, a peroxide is added to the perfluoroelastomer comprising, either as pendant groups in recurring units of the main chain, or as end-groups, certain cure sites able to react under radical condition, and to a polyfunctional unsaturated compound. Under the effect of heat, the peroxide generates radicals which promote reactions of the fluoroelastomer chain, activated through the cure sites, with the polyfunctional unsaturated compound for yielding a cured mass, with chemically interconnected polymer chains.

Nevertheless, when applications are targeted with continuous operating temperatures of 310° C. or above, perfluoroelastomers which are triazine-cured, i.e. which have been crosslinked using chemistry of cyano groups present in the polymer chain, are generally preferred, as offering better thermal stability, not achievable using polyfunctional cross-linkers such as TAIC or bis-olefins, which, because of their hydrogen-containing structure are deemed to represent points of weakness and lack of thermal resistance.

Nevertheless, chemistry of —CN-containing comonomers is very complex and access to triazine-curable perfluoroelastomer is submitted to economical constrains.

In this field there is hence a continuous quest for perfluoroelastomer curable blends offering an advantageous balance of properties, and more specifically high thermal stability and outstanding steam resistance, and which are easily accessible at reasonable costs.

SUMMARY OF INVENTION

The Applicant has now found that a particular combination of bis-olefin cross-linking agent and certain organic basic compound, in given amounts, is effective in the peroxide curing of perfluoroelastomers and provides for cured gum possessing a particularly favourable balance of thermal resistance and availability/cost, so that target performances for high temperature ratings can be achieved through the use of this curative at competitive costs.

The invention thus pertains to a perfluoroelastomer composition comprising:
- at least one perfluoroelastomer comprising iodine and/or bromine atoms [perfluoroelastomer (A)];
- from 0.5 to 5 weight parts, per 100 parts by weight of said perfluoroelastomer (A), of at least one bis-olefin [bis-olefin (OF)] having general formula:

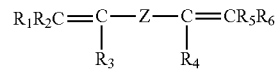

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;

- from 0.1 to 3 weight parts, per 100 parts by weight of said perfluoroelastomer (A), of at least one organic peroxide;
- from 0.1 to 3 weight parts, per 100 parts by weight of said perfluoroelastomer (A), of at least one organic base [base (B)] selected from the group consisting of:
  (i) non-aromatic primary amines or amides complying with general formula (B1m) or (B1d):

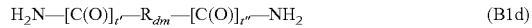

wherein:
  each of t, t' and t", equal to or different from each other and at each occurrence is zero or 1;
  $R_{bm}$ is a monovalent hydrocarbon non-aromatic group having 12 to 30 carbon atoms;
  $R_{dm}$ is a divalent hydrocarbon non-aromatic group having 6 to 30 carbon atoms; and
  (ii) cycloaliphatic secondary or tertiary amines complying with general formula (B2m) or (B2d):

wherein:
  Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto;
  Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto.

The Applicant has surprisingly found that the combination of low amounts of bis-olefin (OF) and base (B), as above detailed, in a peroxide-curable perfluoroelastomer formulation, ensure adequate curing rates and outstanding mechanical and sealing properties, in particular at high temperatures, and excellent steam resistance, thus, overall, delivering an improved cost/performances balance over triazine-curable compounds.

Among bases of formulae (B1m) and (B1d), those wherein:
- $R_{bm}$ is a monovalent aliphatic linear group having 12 to 30 carbon atoms, possibly comprising one or more than one ethylenically unsaturated double bond; and
- $R_{bm}$ is a divalent aliphatic linear group having 6 to 30 carbon atoms, possibly comprising one or more than one ethylenically unsaturated double bond, are particularly preferred.

Among the said non-aromatic primary amines or amides, mention can be particularly made of:
- octadecylamine of formula $CH_3(CH_2)_{17}$—$NH_2$;
- erucamide of formula $H_2N$—$C(O)$—$(CH_2)_{11}$—$CH$=$CH$—$(CH_2)_7CH_3$;
- oleamide of formula $H_2N$—$C(O)$—$(CH_2)_7$—$CH$=$CH$—$(CH_2)_7CH_3$;
- hexamethylenediamine of formula $H_2N$—$(CH_2)_6$—$NH_2$.

Among the said cycloaliphatic secondary or tertiary amines, mention can be made of:
1,8-diazabicycloundec-7-ene (DBU) of formula:

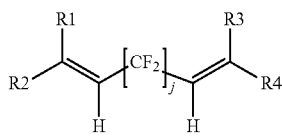

The bis-olefin (OF) is preferably selected from the group consisting of those complying with formulae (OF-1), (OF-2) and (OF-3):

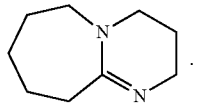

(OF-1)

wherein j is an integer between 2 and 10, preferably between 4 and 8, and R1, R2, R3, R4, equal or different from each other, are H, F or $C_{1-5}$ alkyl or (per)fluoroalkyl group;

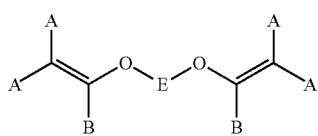

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C$=$CF$—$O$—$(CF_2)_5$—$O$—$CF$=$CF_2$.

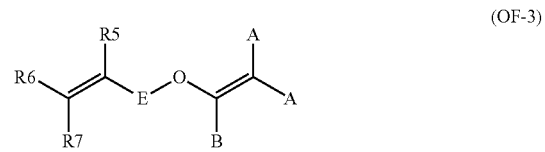

(OF-3)

wherein E, A and B have the same meaning as above defined; R5, R6, R7, equal or different from each other, are H, F or $C_{1-5}$ alkyl or (per)fluoroalkyl group.

The bis-olefin (OF) is more preferably a compound of formula (OF1), as above detailed, and even more preferably a compound of formula $CH_2$=$CH$—$(CF_2)_n$—$CH$=$CH_2$, with n being an integer in the range of 4 to 6.

The amount of bis-olefin (OF) ranges from 0.5 to 5 weight parts per 100 parts by weight of perfluoroelastomer (A).

For enabling obtaining sufficient cross-linking, it is generally preferred to have in the composition amounts of bis-olefin (OF) of at least 1, preferably at least 1.2 weight parts per 100 parts by weight of perfluoroelastomer (A).

Still, useful amounts of bis-olefin (OF) are of generally less than 5, more preferably less than 4, still more preferably less than 3 weight parts per 100 parts by weight of perfluoroelastomer (A).

For the purposes of this invention, the term "perfluoroelastomer" [perfluoroelastomer (A)] is intended to designate a perfluoropolymer resin serving as a base constituent for obtaining a true elastomer, said perfluoropolymer resin being composed of a major amount of recurring units derived from at least one ethylenically unsaturated monomer comprising at least one fluorine atom and free from hydrogen atom (hereafter, perfluorinated monomer) and, optionally, of a minor amount (less than 5% moles) of at least one bis-olefin (OF), as above detailed, which may or may not comprise one or more than one hydrogen atom.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable perfluorinated monomers are notably:
- $C_2$-$C_8$ perfluoroolefins, such as tetrafluoroethylene (TFE), hexafluoropropene (HFP);
- chloro- and/or bromo- and/or iodo-$C_2$-$C_6$ perhalofluoroolefins, like chlorotrifluoroethylene (CTFE);
- perfluoroalkylvinylethers complying with formula $CF_2$=$CFOR_{f1}$ in which $R_{f1}$ is a $C_1$-$C_6$ perfluoroalkyl, e.g. —$CF_3$, —$C_2F_5$, —$C_3F_7$;
- perfluoro-oxyalkylvinylethers complying with formula $CF_2$=$CFOX_0$, in which $X_0$ can be (i) a $C_1$-$C_{12}$ perfluorooxyalkyl having one or more ether groups, e.g. —$C_2F_5$—$O$—$CF_3$; or (ii) a group of formula —$CF_2OR_{f2}$ in which $R_{f2}$ is a $C_1$-$C_6$ perfluoroalkyl, e.g. —$CF_3$, —$C_2F_5$, —$C_3F_7$ (monomers of this type being referred to, herein after, as MOVE);
- perfluorodioxoles, of formula:

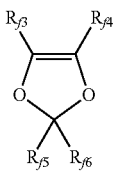

wherein each of $R_{f3}$, $R_{f4}$, $R_{f5}$, $R_{f6}$, equal or different each other, is independently a fluorine atom, a $C_1$-$C_6$ perfluoroalkyl, optionally comprising one or more oxygen atom, e.g. —$CF_3$, —$C_2F_5$, —$C_3F_7$, —$OCF_3$, —$OCF_2CF_2OCF_3$.

Perfluoroelastomers (A) are in general amorphous products or products having a low degree of crystallinity (crystalline phase less than 20% by volume) and a glass transition temperature ($T_g$) below room temperature. In most cases, the perfluoroelastomer (A) has advantageously a $T_g$ below 10° C., preferably below 5° C., more preferably 0° C.

The perfluoroelastomer (A) is preferably selected among tetrafluoroethylene (TFE)-based copolymers, in which TFE is copolymerized with at least one comonomer selected from classes:
(a) $C_3$-$C_8$ perfluoroolefins, such as hexafluoropropylene (HFP);
(b) $C_2$-$C_8$ chloro and/or bromo and/or iodo-perhalofluoroolefins such as chlorotrifluoroethylene (CTFE);
(c) perfluoroalkylvinylethers (PAVE) of formula $CF_2$=$CFOR_f$, wherein $R_f$ is a $C_1$-$C_6$ perfluoroalkyl group, e.g. $CF_3$, $C_2F_5$, $C_3F_7$;
(d) perfluoro-oxyalkylvinylethers complying with formula $CF_2$=$CFOX_0$, in which $X_0$ can be (i) a $C_1$-$C_{12}$ perfluorooxyalkyl having one or more ether groups, e.g. —$C_2F_5$—O—$CF_3$; or (ii) a group of formula —$CF_2OR_{f2}$ in which $R_{f2}$ is a $C_1$-$C_6$ perfluoroalkyl, e.g. —$CF_3$, —$C_2F_5$, —$C_3F_7$ (monomers of this type being referred to, herein after, as MOVE);
(e) perfluorodioxoles having formula:

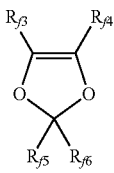

wherein $R_{f3}$, $R_{f4}$, $R_{f5}$, $R_{f6}$, equal or different from each other, are independently selected among fluorine atoms and $C_1$-$C_6$ perfluoroalkyl groups, optionally comprising one or more than one oxygen atom, such as notably —$CF_3$, —$C_2F_5$, —$C_3F_7$, —$OCF_3$, —$OCF_2CF_2OCF_3$.

As said, optionally, perfluoroelastomer (A) also comprises recurring units derived from at least one bis-olefin [bis-olefin (OF)] having same features, as above detailed.

Among specific monomer compositions of perfluoroelastomers (A) suitable for the purpose of the invention, mention can be made of perfluoroelastomers having the following monomer compositions (in mol %):
(i) tetrafluoroethylene (TFE) 50-80%, perfluoroalkyl vinyl ethers (PAVE) 20-50%, bis-olefin (OF) 0-5%;
(ii) tetrafluoroethylene (TFE) 20-70%, perfluoro-oxyalkylvinylether of MOVE type 30-80%, perfluoroalkyl vinyl ethers (PAVE) 0-50%, bis-olefin (OF) 0-5%.

The perfluoroelastomer (A) can be prepared by any known method, such as emulsion or micro-emulsion polymerization, suspension or micro-suspension polymerization, bulk polymerization and solution polymerization.

According to certain preferred embodiments of the invention, the fluoroelastomer (A) comprises iodine and/or bromine atoms; the selection among iodine/bromine is not particularly critical, provided that they ensure adequate reactivity in curing. Iodine is nevertheless generally preferred.

These iodine or bromine atoms can be comprised in the perfluoroelastomer (A) as pending groups bound to the backbone of the perfluoroelastomer (A) polymer chain (by means of incorporation in the perfluoroelastomer (A) chain of recurring units derived from monomers having iodine and/or bromine atoms (referred to as cure-site containing recurring units) and/or can be comprised as terminal groups of said polymer chain.

Among cure-site containing recurring units, mention can be notably made of (CSM-1) iodine or bromine containing monomers of formula:

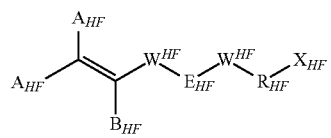

wherein each of $A_{Hf}$, equal to or different from each other and at each occurrence, is independently selected from F, and Cl; $B_{Hf}$ is any of F, Cl, and $OR^{Hf}_B$, wherein $R^{Hf}_B$ is a branched or straight chain perfluoroalkyl radical; each of $W^{Hf}$ equal to or different from each other and at each occurrence, is independently a covalent bond or an oxygen atom; $E_{Hf}$ is a perfluorinated divalent group having 2 to 10 carbon atom; $R_{Hf}$ is a branched or straight chain perfluorinated alkyl radical; and $X_{Hf}$ is a halogen atom selected from the group consisting of Iodine and Bromine.

Among cure-site containing monomers of type (CSM1), preferred monomers are those selected from the group consisting of:
(CSM1-A) iodine-containing perfluorovinylethers of formula:

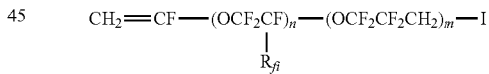

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) 17 May 1988, U.S. Pat. No. 4,564,662 (MINNESOTA MINING & MFG [US]) 14 Jan. 1986 and EP 199138 A (DAIKIN IND LTD) 29 Oct. 1986); and
(CSM-1B) iodine-containing ethylenically unsaturated compounds of formula:

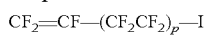

wherein p is an integer from 1 to 5;
(CSM-1C) bromo and/or iodo alpha-olefins containing from 2 to 10 carbon atoms such as bromotrifluoroethylene or bromotetrafluorobutene described, for example, in U.S. Pat. No. 4,035,565 (DU PONT) 12 Jul. 1977 or other compounds bromo and/or iodo alpha-olefins disclosed in U.S. Pat. No. 4,694,045 (DU PONT) 15 Sep. 1987.

According to a first embodiment, the iodine and/or bromine atoms are comprised as pending groups bound to the backbone of the perfluoroelastomer polymer chain. The perfluoroelastomer according to this embodiment generally comprises recurring units derived from iodine or bromine containing monomers (CSM-1) in amounts of 0.05 to 5 mol per 100 mol of all other recurring units of the perfluoroelastomer (A), so as to advantageously ensure iodine and/or bromine weight content to meet requirement for achieving adequate curing rate and crosslinking density.

According to a second preferred embodiment, the iodine and/or bromine atoms are comprised as terminal groups of the perfluoroelastomer (A); the perfluoroelastomer according to this embodiment is generally obtained by addition to the polymerization medium during perfluoroelastomer manufacture of anyone of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and alkali metal or alkaline-earth metal iodides and/or bromides, such as described notably in U.S. Pat. No. 5,173,553 (AUSIMONT SRL) 22 Dec. 1992.

The perfluoroelastomer (A) of the invention comprises advantageously iodine and/or bromine atoms in an amount of 0.001 to 10% wt, with respect to the total weight of the perfluoroelastomer (A).

According to this embodiment, for ensuring acceptable reactivity it is generally understood that the content of iodine and/or bromine in the perfluoroelastomer (A) should be of at least 0.05% wt, preferably of at least 0.1% weight, more preferably of at least 0.15% weight, with respect to the total weight of perfluoroelastomer (A).

On the other side, amounts of iodine and/or bromine not exceeding preferably 7% wt, more specifically not exceeding 5% wt, or even not exceeding 4% wt, with respect to the total weight of perfluoroelastomer (A), are those generally selected for avoiding side reactions and/or detrimental effects on thermal stability.

The curable composition of the invention comprises at least one organic peroxide.

Among most commonly used organic peroxides, mention can be made of dialkyl peroxides, for instance di-tert-butyl peroxide, 2,5-dimethyl-2,5-bis(tert-butylperoxy)hexane, bis (1,1-diethylpropyl)peroxide, bis(1-ethyl-1-methylpropyl) peroxide, 1,1-diethylpropyl-1-ethyl-1-methylpropyl-peroxide, 2,5-dimethyl-2,5-bis(tert-amylperoxy)hexane; dicumyl peroxide; dibenzoyl peroxide; di-tert-butyl perbenzoate; bis [1,3-dimethyl-3-(tert-butylperoxy)butyl] carbonate.

The amount of peroxide ranges from 0.1 to 10 weight parts per 100 parts by weight of perfluoroelastomer (A).

For achieving reasonable curing rates, it is generally preferred to have in the composition amounts of peroxide of at least 0.5, preferably at least 0.8 weight parts per 100 parts by weight of perfluoroelastomer (A).

Equally, to the sake of efficiency, amount of peroxide is of generally less than 3, more preferably less than 2.5, still more preferably less than 2 weight parts per 100 parts by weight of perfluoroelastomer (A).

The perfluoroelastomer composition of the invention may additionally comprise other ingredients, such as notably:

(a) a metal compound, generally in amounts of between 1 and 15, and preferably between 2 and 10 weight parts per 100 parts of perfluoroelastomer (A), typically selected from the group consisting of (i) oxides and hydroxides of divalent metals, for instance Mg, Zn, Ca or Pb, (ii) salts of a weak acid, for instance Ba, Na, K, Pb, Ca stearates, benzoates, carbonates, oxalates or phosphites, and (iii) mixtures of (i) and (ii);

(b) conventional additives, selected generally from the group consisting of fillers (e.g. carbon black), thickeners, pigments, antioxidants, stabilizers, processing aids, and the like, in amounts of generally 5 and 150, preferably between 10 and 100 weight parts, more preferably between 20 and 60 weight parts, per 100 parts of perfluoroelastomer (A).

It is generally understood that the perfluoroelastomer composition of the invention comprises no other ingredients beside those above listed; in other terms, the inventive composition generally consists essentially of the perfluoroelastomer (A), the organic peroxide, the bis-olefin (OF), the base (B), and optionally metal compounds, and conventional additives, as above detailed.

The invention also pertains to a method of using the perfluoroelastomer composition, as above described, for fabricating shaped articles.

The perfluoroelastomer composition can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, perfluoroelastomer (A) into a finished article made of non-tacky, strong, insoluble, chemically and thermally resistant cured perfluoroelastomer.

Finally, the invention pertains to cured articles obtained from the perfluoroelastomer composition, as above detailed.

The cured articles can be notably pipes, joints, O-ring, hose, and the like.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

Raw Materials

TECNOFLON® PFR 95HT (PFR95HT, herein after) is a TFE/perfluoromethylvinylether perfluoroelastomer, comprising recurring units derived from a bis-olefin of formula $CH_2=CH—(CF_2)_6—CH=CH_2$, and iodine cure sites, commercially available from Solvay Specialty Polymers Italy, S.p.A.

TECNOFLON® P 757 (P757, herein after) is a VDF/TFE/HFP fluoroelastomer, comprising recurring units derived from a bis-olefin of formula $CH_2=CH—(CF_2)_6—CH=CH_2$, and iodine cure sites, commercially available from Solvay Specialty Polymers Italy, S.p.A.

Curing, Mechanical and Thermal Resistance Property Determination on Cured Samples Perfluoroelastomers were compounded with the additives as detailed in following table in a Brabender mixer. Plaques and O-rings (size class=214) have been cured in a pressed mould and then post-treated in an air circulating oven in conditions (time, temperature) below specified.

The tensile properties have been determined on specimens punched out from the plaques, according to the DIN 53504 S2 Standard.

The compression set (C-SET) has been determined on O-ring, spaceman standard AS568A (type 214), according to the ASTM D 395, method B. Cure behaviour was characterized by Moving Disk Rheometer (MDR), at a temperature of 170° C., by determining the following properties:

$M_L$=Minimum torque (lb×in)
$M_H$=Maximum torque (lb×in)
$\Delta M = M_H - M_L$ (lb×in)
$t_{S2}$=Scorch time, time for two units rise from $M_L$ (sec);
$t'_{90}$=Time to 90% state of cure (sec).

The tensile properties have been determined on specimens punched out from the plaques, according to the DIN 53504 S2 Standard, either on specimens as obtained after post-cure, or on specimens which have been further submitted to ageing by exposure to steam for 168 hours at 300° C.

The following properties (and/or the changes in the following properties following ageing) were determined:

$M_{50}$ is the tensile strength in MPa at an elongation of 50%
$M_{100}$ is the tensile strength in MPa at an elongation of 100%
T.S. is the tensile strength in MPa;
E.B. is the elongation at break in %.
The Shore A hardness (3") (HDS) has been determined on 3 pieces of plaque piled according to the ASTM D 2240 method.

Results are summarized in the following tables.

Tests carried out with PFR95HT and different basic compounds

Curable compounds have been prepared mixing:
100 phr of PRF95HT;
1.5 phr of a bis-olefin of formula $CH_2$=CH—$(CF_2)_6$—CH=$CH_2$;
1 phr of neat 2,5-dimethyl-2,5-di(t-butylperoxy)hexane ($C_{16}H_{34}O_4$), commercially available as LUPEROX® 101 liquid from Atofina;
15 phr of Austin black (carbon black) commercially available from Coal Fillers Inc;
15 phr of carbon black N990 MT commercially available from Cancarb; and
0.5 phr of different additives, either basic compounds according to the invention, or other bases or lubricants.

Basic compounds which were used are listed below:
(B-1): octadecylamine of formula $CH_3(CH_2)_{17}$—$NH_2$;
(B-2): erucamide of formula $H_2N$—C(O)—$(CH_2)_{11}$—CH=CH—$(CH_2)_7CH_3$;
(B-3) oleamide of formula $H_2N$—C(O)—$(CH_2)_7$—CH=CH—$(CH_2)_7CH_3$;
(B-4) hexamethylenediamine of formula $H_2N$—$(CH_2)_6$—$NH_2$.
(B-5) 1,8-diazabicycloundec-7-ene (DBU) of formula:

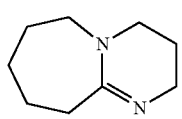

In examples of comparison, use has been made of:
(C-1): proton sponge of formula:

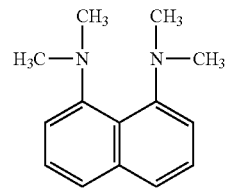

(C-2): paraffin wax lubricant.

Results summarized in Table 1 have been obtained by curing/molding specimens for 10 minutes at 170° C. and then post-curing the same for (8+16) hours at 200° C.

TABLE 1

| Run | Additive | $\Delta M$ (lb × in) | $t_{S2}$ (sec) | $t'_{90}$ (sec) | C-Set (%) | $M_{100}$ (MPa) | E.B. (%) |
|---|---|---|---|---|---|---|---|
| 1C | none | 16 | 54 | 401 | 69 | 10.2 | 177 |
| 2 | (B-1) | 23.5 | 43 | 178 | 41 | 12.2 | 172 |
| 3 | (B-2) | 23 | 47 | 221 | 50 | 12.0 | 165 |
| 4 | (B-3) | 21.7 | 49 | 241 | 55 | 12.1 | 177 |
| 5 | (B-4) | 21.2 | 41 | 216 | 43 | 12.0 | 166 |
| 6 | (B-5) | 22.1 | 53 | 182 | 47 | 11.5 | 157 |
| 7C | (C-1) | 2.9 | 263 | 496 | no acceptable curing | | |
| 8C | (C-2) | n.d. | n.d. | n.d. | 81 | n.d. | n.d. |
| 9C(*) | none | n.d. | n.d. | n.d. | >100 | n.d. | n.d. |
| 10C(*) | (B-1) | n.d. | n.d. | n.d. | >100 | n.d. | n.d. | n.d.: not determined;
(*)in examples 9C and 10C, 3 phr of DRIMIX® triallylisocyanurate (TAIC) were used instead of 1.5 phr of bis-olefin.

Results summarized above clearly demonstrate the advantageous effect on the addition of the basic compounds in combination with low amounts of bis-olefin as crosslinking agent, according to the invention, on the curing behavior and crosslinking density, and on C-set (70 h at 300° C.). The time required for curing is significantly reduced, while the gain in torque is significantly enhanced.

When using an aromatic amine, different from the basic compound of the invention (e.g. proton sponge, see Ex. 7C), substantially no increase is torque is obtained, which is a demonstration of the absence of adequate curing.

Further, when using TAIC as crosslinking agent, no enhancement in C-set at high temperature is obtained, even when using a basic compound such as (B-1).

Results in Table 2 are relative to compounds as detailed herein above in runs 1C and 2, submitted to steam resistance tests (168 h at 300° C.) after different post-curing conditions.

TABLE 2

| | $\Delta M_{50}$ | $\Delta M_{100}$ | $\Delta$T.S. | $\Delta$E.B. | $\Delta$HDS |
|---|---|---|---|---|---|
| Molding 10 min at 170° C. - Post-curing (8 + 16) h at 200° C. | | | | | |
| 1C | −17 | −11 | 2 | 25 | −4 |
| 2 | −4 | 13 | 11 | −17 | 0 |
| Molding 10 min at 170° C. - Post-curing (8 + 16) h at 250° C. | | | | | |
| 1C | −36 | −40 | −21 | 65 | −3 |
| 2 | −13 | −2 | 1 | −1 | −2 |
| Molding 10 min at 170° C. - Post-curing (8 + 16) h at 290° C. | | | | | |
| 1C | −26 | −37 | −31 | 37 | −6 |
| 2 | −18 | −16 | 1 | 21 | −1 |

Tess Carried Out with P757 and (B-1)
A curable compound (11C) has been prepared mixing:
100 phr of PRF757;
1.5 phr of a bis-olefin of formula $CH_2$=CH—$(CF_2)_6$—CH=$CH_2$;

1 phr of neat 2,5-dimethyl-2,5-di(t-butylperoxy)hexane ($C_{16}H_{34}O_4$), commercially available as LUPEROX® 101 liquid from Atofina;

15 phr of Austin black (carbon black) commercially available from Coal Fillers Inc;

15 phr of carbon black N990 MT commercially available from Cancarb; and 0.5 phr of (B-1), molded 10 minutes at 170° C. and post-cured (8+16) hours at 200° C. C-set (70 h at 300° C.) was found to exceed 100%.

Performances thereof have been compared with those obtained with curable compounds (12C and 13C) including:
100 phr of PRF757;
3 phr of triallylisocyanurate (TAIC), commercially available as DRIMIX®;
1 phr of neat 2,5-dimethyl-2,5-di(t-butylperoxy)hexane ($C_{16}H_{34}O_4$), commercially available as LUPEROX® 101 liquid from Atofina;
30 phr of carbon black N990 MT commercially available from Cancarb; and
0.5 phr of (B-1) (12C) or no additive (13C).

Also in these cases, C-set (70 h at 300° C.) was found to exceed 100%.

As a whole, hence, in no circumstances, any effect can be obtained with combining bis-olefin and basic compound with a fluoroelastomer based on VDF, i.e. partially fluorinated, and not perfluorinated, as in the inventive curable compositions.

The invention claimed is:

1. A perfluoroelastomer composition comprising:
   at least one perfluoroelastomer (A), wherein perfluoroelastomer (A) comprises iodine and/or bromine atoms;
   from 1.2 to less than 3 weight parts, per 100 parts by weight of said perfluoroelastomer (A), of at least one bis-olefin (OF) having general formula:

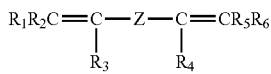

wherein $R_1$, $R_2$, $R_3$, $R_4$, $R_5$ and $R_6$, equal or different from each other, are H, a halogen, or a $C_1$-$C_5$ optionally halogenated group, optionally comprising one or more oxygen group;
   Z is a linear or branched $C_1$-$C_{18}$ optionally halogenated alkylene or cycloalkylene radical, optionally containing oxygen atoms, or a (per)fluoropolyoxyalkylene radical;
   from 0.1 to 3 weight parts, per 100 parts by weight of said perfluoroelastomer (A), of at least one organic peroxide;
   from 0.1 to 3 weight parts, per 100 parts by weight of said perfluoroelastomer (A), of at least one organic base (B) selected from the group consisting of:
   non-aromatic primary amines or amides complying with general formula (B1m) or (B1d):

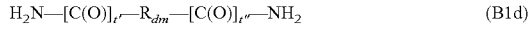

wherein:
   each of t, t' and t", equal to or different from each other and at each occurrence is zero or 1;

$R_{bm}$ is a monovalent hydrocarbon non-aromatic group having 12 to 30 carbon atoms;
   $R_{dm}$ is a divalent hydrocarbon non-aromatic group having 6 to 30 carbon atoms.

2. The perfluoroelastomer composition according to claim 1, wherein said nonaromatic primary amines or amides are selected from the group consisting of:
   octadecylamine of formula $CH_3(CH_2)_{17}$—$NH_2$;
   erucamide of formula $H_2N$—$C(O)$—$(CH_2)_{11}$—$CH=CH$—$(CH_2)_7CH_3$;
   oleamide of formula $H_2N$—$C(O)$—$(CH_2)_7$—$CH=CH$—$(CH_2)_7CH_3$; and
   hexamethylenediamine of formula $H_2N$—$(CH_2)_6$—$NH_2$;
   and said cycloaliphatic secondary or tertiary amines are selected from the group consisting of:
   1,8-diazabicycloundec-7-ene (DBU) of formula:

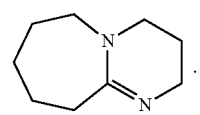

3. The perfluoroelastomer composition of claim 1, wherein the bis-olefin (OF) is selected from the group consisting of those complying with formulae (OF-1), (OF-2) and (OF-3):

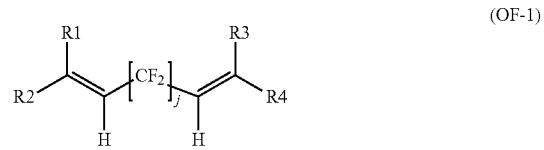

wherein j is an integer between 2 and 10, and R1, R2, R3, R4, equal or different from each other, are H, F or $C_{1-5}$ alkyl or (per)fluoroalkyl group;

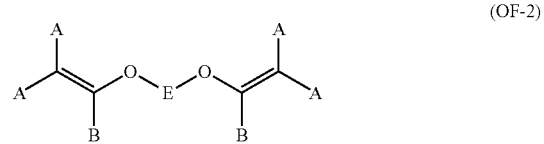

wherein each A, equal or different from each other and at each occurrence, is independently selected from F, Cl, and H; each B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages;

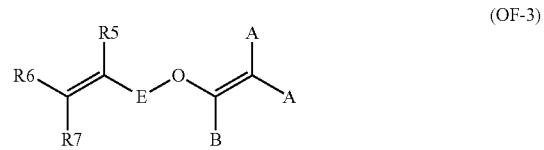

wherein E, A and B have the same meaning as above defined; $R_5$, $R_6$, $R_7$, equal or different from each other, are H, F or $C_{1-5}$ alkyl or (per)fluoroalkyl group.

4. The perfluoroelastomer composition of claim 3, wherein said bis-olefin (OF) is a compound of formula (OF1).

5. The perfluoroelastomer composition according to claim 1, wherein said perfluoroelastomer (A) comprises iodine and/or bromine atoms in an amount of 0.001 to 10% wt, with respect to the total weight of the perfluoroelastomer (A).

6. The perfluoroelastomer composition according claim 5, wherein the amount of iodine and/or bromine in said perfluoroelastomer (A) is of at least 0.05% wt, with respect to the total weight of perfluoroelastomer (A).

7. The perfluoroelastomer composition according to claim 1, wherein said organic peroxide is selected from the group consisting of di-tert-butyl peroxide; 2,5-dimethyl-2,5-bis (tert-butylperoxy)hexane; bis(1,1-diethylpropyl)peroxide; bis(1-ethyl-1-methylpropyl)peroxide; 1,1-diethylpropyl-1-ethyl-1-methylpropyl-peroxide; 2,5-dimethyl-2,5-bis(tert-amylperoxy)hexane; dicumyl peroxide; dibenzoyl peroxide di-tert-butyl perbenzoate; and bis[1,3-dimethyl-3-(tert-butylperoxy)butyl]carbonate.

8. The perfluoroelastomer composition according to claim 1, wherein said perfluoroelastomer (A) is selected from the group consisting of perfluoroelastomers having the following monomer compositions (in mol %):
   (i) tetrafluoroethylene (TFE) 50-80%, perfluoroalkyl vinyl ethers (PAVE) 20-50%, bis-olefin (OF) 0-5%; and
   (ii) tetrafluoroethylene (TFE) 20-70%, perfluoro-oxyalkylvinylether of MOVE type 30-80%, perfluoroalkyl vinyl ethers (PAVE) 0-50%, bis-olefin (OF) 0-5%.

9. A method for fabricating shaped articles, the method comprising using the perfluoroelastomer composition according to claim 1.

10. The method according to claim 9, wherein the perfluoroelastomer composition is fabricated into the desired shaped article, which is subjected to vulcanization during the processing itself and/or in a subsequent step.

11. A cured article comprising the perfluoroelastomer composition according to claim 1.

12. The perfluoroelastomer composition of claim 3, wherein E is a —$(CF_2)_m$— group, with m being an integer from 3 to 5.

13. The perfluoroelastomer composition of claim 3, wherein said bis-olefin (OF) is a compound of formula $F_2C=CF-O-(CF_2)_5-O-CF=CF_2$.

14. The perfluoroelastomer composition of claim 4, wherein said bis-olefin (OF) is a compound of formula $CH_2=CH-(CF_2)_n-CH=CH_2$, with n being an integer in the range of 4 to 6.

15. The perfluoroelastomer composition according claim 6, wherein the amount of iodine and/or bromine in said perfluoroelastomer (A) is of at least 0.1% weight, with respect to the total weight of perfluoroelastomer (A).

16. The perfluoroelastomer composition according claim 6, wherein the amount of iodine and/or bromine in said perfluoroelastomer (A) is of at least 0.15% weight, with respect to the total weight of perfluoroelastomer (A).

* * * * *